April 20, 1954 T. H. BIRCH ET AL 2,675,893
LOAD COMPENSATING BRAKE MECHANISM
Original Filed Aug. 23, 1948 2 Sheets-Sheet 1

INVENTORS:
Thomas H. Birch and
Alfred Vincent Nystrom
BY George Heisman
Atty.

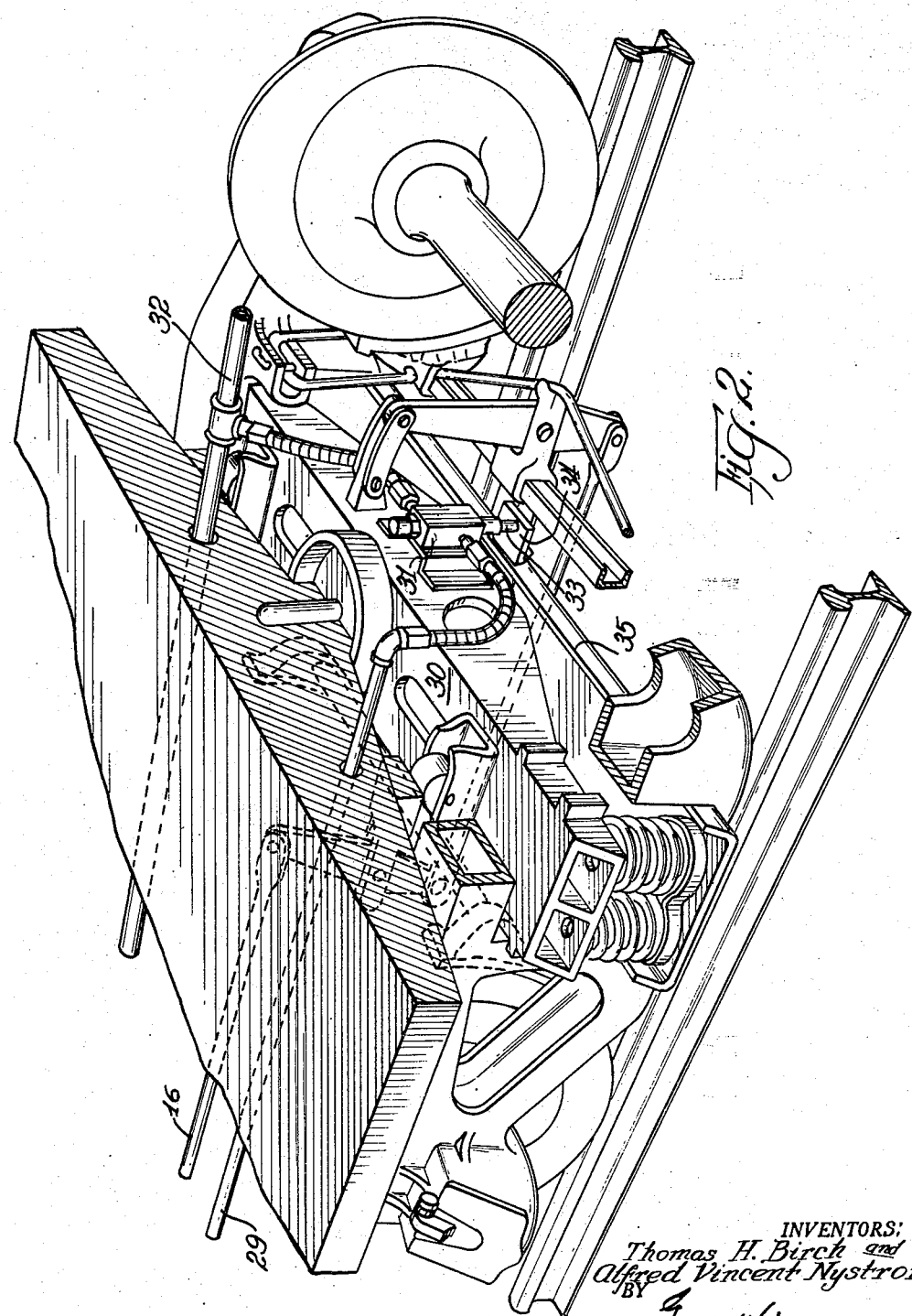

Patented Apr. 20, 1954

2,675,893

UNITED STATES PATENT OFFICE 2,675,893

LOAD COMPENSATING BRAKE MECHANISM

Thomas H. Birch, Milwaukee, Wis., and Alfred Vincent Nystrom, Chicago, Ill.; said Nystrom assignor to said Birch Original application August 23, 1948, Serial No. 45,755, now Patent No. 2,549,957, dated April 24, 1951. Divided and this application November 21, 1949, Serial No. 128,668

1 Claim. (Cl. 188—195)

Our invention relates to mechanism whereby the brake cylinder levers of railroad cars are made more effective and involves air actuated means having valved connection with the air supply or brake air line of the car and controlled by the car load; said means being adapted to control the relation or distance between the connecting link pivots and the pivots at the outer ends or power arms of the levers in keeping with the car load.

Our invention contemplates means whereby the power arms of the live lever and of the fulcrum or floating lever are made more effective by shifting the pivotal connection of said levers with the connecting link and thereby effectively increasing the distance between the fulcrum points and the pivot points at the outer or power arms of both levers at the same ratio during brake application of a loaded car, thus providing a load compensating arrangement whereby the force transmitted to the top rods of the brake rigging is increased in keeping with the increased load of the car.

The objects and advantages of our invention will be readily comprehended from the detailed description of the accompanying drawings, therein—

Figure 2 is a perspective view of a portion of a freight car truck with portions of the brake rigging and body bolster broken away and disclosing the valved air connection between the source of air supply and our improved compensating mechanism.

Figure 1:
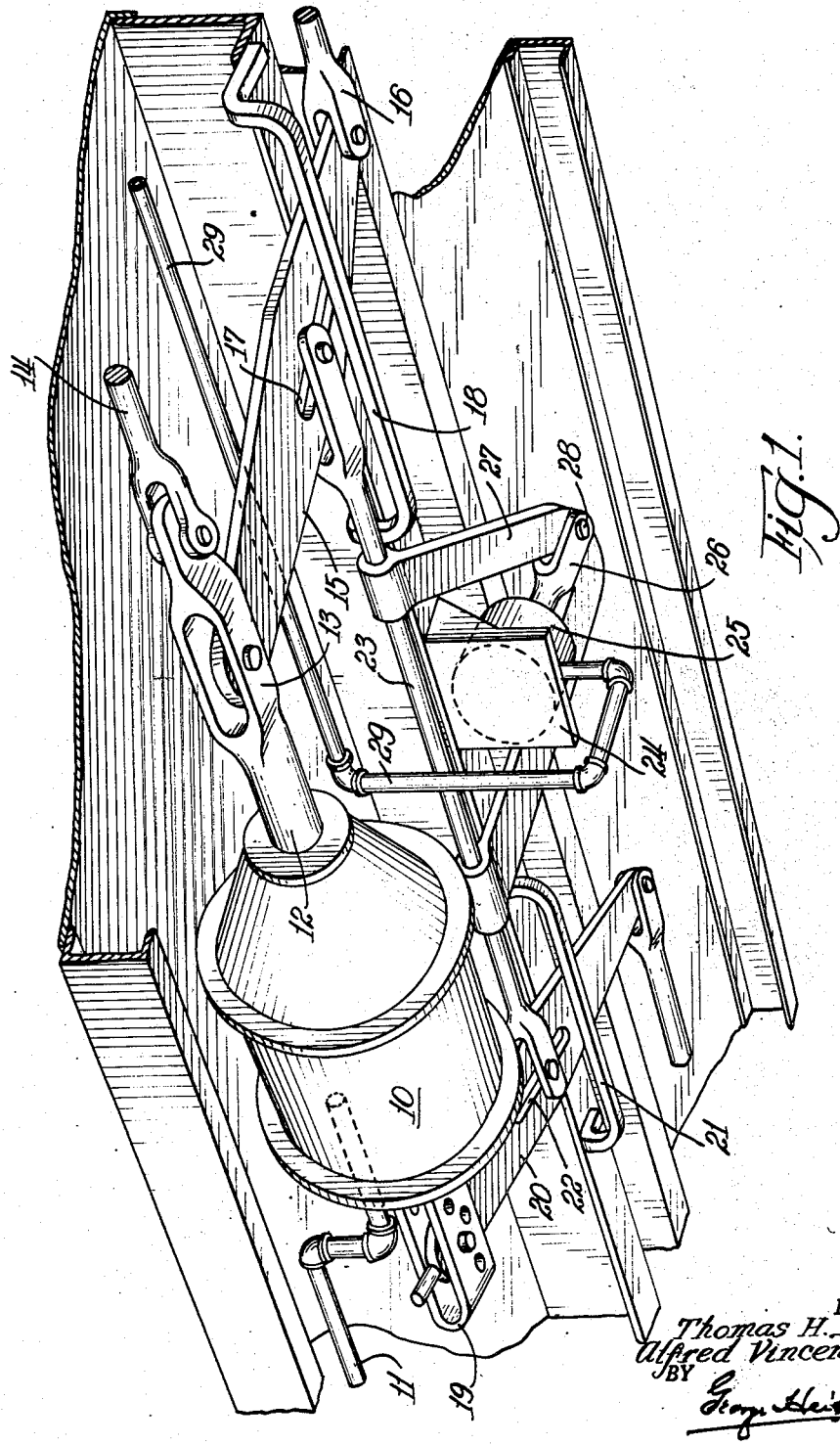
Figure 1 is a perspective view, as viewed from beneath a railroad car, looking upwardly rearwardly of a portion of a car underframe, showing an air cylinder and connected levers and connecting link, with our improved air actuated connecting link control.

The exemplification disclosed in Figure 1 consists of subject matter divided from our application Serial Number 45,755 filed August 23, 1948, patented April 24, 1951, as 2,549,957 and shows the improved mechanism applied to the brake rigging of a railroad freight car of which a portion of the underframing is disclosed.

The brake rigging involves the usual air cylinder 10 with an air supply pipe 11 and the piston push rod 12 shown provided with a yoke portion 13 to which link or rod 14 is pivotally connected and which leads to the usual truck lever of the brake mechanism. The yoke like portion 13 provides pivotal mounting for the power arm of live lever 15 whose opposite end has a truck lever controlling rod pivotally connected thereto; a portion of the rod being shown at 16. The lever 15 intermediate its ends is provided with an elongated slot 17 disposed lengthwise of the lever which passes through and is supported by the usual lever guide 18.

The closed end or head of cylinder 10 is provided with an apertured yoke or bracket 19 and receives the outer end of the power arm of the fulcrum or floating lever 20; the plurality of apertures or holes in the bracket 19 receive the pivot pin and permit angular adjustment of the floating lever. Lever 20 is supported by guide 21.

The lever 20, similar to live lever 15, is provided intermediate its ends with an elongated and lengthwisely disposed slot 22 and the two levers 15 and 20 are connected by the connecting rod 23 whose pivot pins pass loosely through the lever slots 17 and 22.

A suitable depending plate or bracket 24 is rigidly secured to the car underframe and is provided with a small air cylinder 25, having a spring controlled piston whose push rod is shown at 26. Disposed about or straddling the bracket, cylinder and push rod is a V-shaped yoke 27, whose ends are swiveled on or secured to the connecting rod 23. The V-shaped yoke 27 and the cylinder push rod 26 are disposed away from the air cylinder 10; and the push rod 26 is connected at 28 to the apex portion of the V-shaped yoke 27.

The push rod 26 is normally retracted into the cylinder, causing the V-shaped yoke to move therewith, thereby forcing and holding the connecting rod 23 and its pivot pins toward the upper ends of the slots 17 and 22 (as viewed in Figure 1) in both levers 15 and 20. This is the normal or light car load position of the mechanism, at which time no air is supplied to the cylinder 25.

Air is admitted to cylinder 25 when the car load reaches a prearranged amount sufficient to depress or lower the truck bolster, at which time air will be admitted to cylinder 25 by pipe 29 during brake application.

Pipe 29 leads to a point adjacent the truck bolster, as shown in Figure 2, where the bolster 30 has a control or three-way valve 31 secured thereto and pipe 29 is connected with this valve 31, which in turn has connection with the train line or air pipe 32.

The control valve 31 is shown in the nature of a suitable plunger type, with its plunger 33 depending vertically into proximity with a bracket 34 shown secured on the spring plank 35 beneath the bolster 30. Under normal or light car conditions, valve 31 will not admit air to pipe 29 during brake applications.

As the car load on the bolster 30 increases and depresses the bolster, the valve plunger 33 will engage and be actuated by the bracket 34 and allow air from train or air line 32 to flow through the valve 31 and into pipe 29 to cylinder 25 during brake applications. That is to say, as air from the train or air pipe 32 is admitted to conduit or pipe 29 and thence into the closed end of the small cylinder 25, its piston push rod 26 will be moved outwardly and cause the yoke 27 to pull connecting rod 23 toward the lower or right hand end of both slots 17 and 22 and thereby lengthen the power arms of both levers 15 and 20 and consequently increase the power of said levers for more efficient braking force and brake application.

As long as air is admitted to cylinder 25 the connecting rod 23 and its fulcrum providing ends, for levers 15 and 20, will remain removed from the upper ends (as they appear in Figure 1) of the slots 17 and 22 and thereby increase the effective force of levers 15 and 20 of the loaded car during brake applications on the train.

With a train of loaded cars, the brake force obtained with the usual brake rigging decreases with the number of cars or increased train load and as a result the stopping distance of the train far exceeds that which would be obtained if the cars were empty. Our improved mechanism is designed to overcome this serious difficulty and to provide safer train operation by automatically providing approximately the same brake force on loaded cars that exists during brake application with empty cars.

What we claim is:

In combination with the truck bolster of a railroad car having an air line, an air brake cylinder and its piston push rod, a live lever, a floating lever, both levers being actuated by said piston push rod, a rigid connecting rod having pin and slot connection at its ends with said levers, and an auxiliary air cylinder with a cylinder push rod and a valve-controlled connection with the air line, operable by downward movement of the truck bolster, a load compensating brake mechanism composed of a single-piece V-shaped yoke disposed about and straddling the auxiliary cylinder, with the ends of the yoke arms socketed at their ends for passage of the connecting rod therethrough, while the apex of the yoke has the auxiliary cylinder push rod pivotally connected thereto and the position of the yoke and connecting rod thereby controlled when air is admitted to the auxiliary cylinder during brake application.

References Cited in the file of this patent

UNITED STATES PATENTS

| Number | Name | Date |
|---|---|---|
| 538,851 | Teal | May 7, 1895 |
| 621,653 | Gilman et al. | Mar. 21, 1899 |
| 684,313 | Sauvage | Oct. 8, 1901 |
| 2,363,580 | Farmer | Nov. 28, 1944 |

FOREIGN PATENTS

| Number | Country | Date |
|---|---|---|
| 727,388 | France | June 17, 1932 |